United States Patent [19]

Furuhashi

[11] 4,337,512
[45] Jun. 29, 1982

[54] APPARATUS AND METHOD FOR CONTROLLING INTERNAL COMBUSTION ENGINE

[75] Inventor: Toshio Furuhashi, Ibaraki, Japan

[73] Assignee: Hitachi, Ltd., Tokyo, Japan

[21] Appl. No.: 80,203

[22] Filed: Oct. 1, 1979

[30] Foreign Application Priority Data

Sep. 29, 1978 [JP] Japan .................................. 53-119349

[51] Int. Cl.³ .......................... F02P 5/06; F02M 3/04
[52] U.S. Cl. ................ 364/431.09; 123/423; 123/492; 123/493; 364/431.04
[58] Field of Search ................ 364/431; 123/422, 423, 123/480, 486, 492, 493

[56] References Cited

U.S. PATENT DOCUMENTS

| | | | |
|---|---|---|---|
| 3,935,845 | 2/1976 | Aono et al. | 123/422 |
| 4,204,483 | 5/1980 | Harada et al. | 123/493 |
| 4,221,191 | 9/1980 | Asano et al. | 123/493 X |
| 4,240,390 | 12/1980 | Takeda | 123/480 |
| 4,257,363 | 3/1981 | Zeller | 123/493 X |
| 4,259,723 | 3/1981 | Fujisawa et al. | 364/431 |
| 4,285,314 | 8/1981 | Kiencke et al. | 123/423 X |

FOREIGN PATENT DOCUMENTS 54-145819  11/1979  Japan ................................. 123/493

Primary Examiner—Felix D. Gruber
Attorney, Agent, or Firm—Craig and Antonelli

[57] ABSTRACT

An apparatus and a method for controlling an internal combustion engine are disclosed, wherein upon deceleration of the engine, fuel injection is interrupted on the basis of determination of an engine operating condition to interrupt the fuel injection, while the fuel injection is then restored on the basis of determination of an engine operating condition to restore the fuel injection. When the determination is made such that the fuel injection is to be restored, the ignition timing determined in dependence on the prevailing engine operating condition is delayed. The delayed ignition timing is progressively advanced after restoration of the fuel injection to regain the original ignition timing determined in dependence on the prevailing engine operating condition.

7 Claims, 3 Drawing Figures ized control apparatuses for internal combustion engines.

APPARATUS AND METHOD FOR CONTROLLING INTERNAL COMBUSTION ENGINE

FIELD OF THE INVENTION

The present invention relates to an apparatus and a method for controlling an internal combustion engine provided with a fuel injection control system which is adapted to stop or interrupt fuel injection to the engine upon deceleration thereof. In particular, the invention relates to an improvement in the performance of the fuel injection control system in conjunction with restoration of the once interrupted fuel injection.

BACKGROUND OF THE INVENTION

In hitherto known control systems for internal combustion engines provided with electronic fuel injection control apparatus, deceleration of the engine is detected on the basis of the position or opening degree of a throttle valve and the revolution speed of the engine crankshaft. When deceleration of the engine is determined from the fact that the throttle valve is at the fully closed position while the engine is operated at a higher speed than a predetermined value, the fuel injection is stopped or interrupted, thereby enhancing the action of engine braking and at the same time reducing fuel consumption. However, when the normal fuel injection is restored with normal ignition timing after interruption, the rotational moment or torque of the engine will be increased abruptly, involving shocks or the like adverse influences to the comfortable ride in an associated motor vehicle. Such undersirable phenomena are particularly noticeable when the engine speed is very low immediately before the fuel injection is re-initiated. Accordingly, in order to avoid such a discomfort, the revolution speed of the engine crankshaft at which fuel injection is to be re-initiated after interruption has to be set at a relatively high value which, however, means that the action of engine braking as well as the advantage with respect to fuel consumption must be correspondingly sacrificed.

As attempts to overcome the difficulty described above, improvements of the fuel injection system have heretofore been proposed. For example, in Japanese Patent Application Laid-open No. 64633/75 and Japanese Utility Model Application Laid-open No. 41524/78, it is proposed that the quantity of fuel to be injected is progressively increased to a normal quantity upon restoration of the fuel injection after the interruption thereof to thereby assure a comfortable ride.

SUMMARY OF THE INVENTION

An object of the invention is to provide an apparatus and a method for controlling electronically an internal combustion engine such that, when the fuel injection is to be restored after the interruption or temporary stopping for deceleration of the engine, the ignition timing is at first delayed and then advanced progressively to the normal ignition timing to thereby assure a comfortable ride in the associated motor vehicle while retaining the advantages ascribable to the interruption of the fuel injection upon deceleration of the engine.

According to one aspect of the present invention, there is proposed a control apparatus for an internal combustion engine, comprising means for detecting operating conditions of the engine; means for determining fuel injection data on the basis of output signals from the detecting means; means for injection fuel to the engine in accordance with the fuel injection data; means for determining ignition timing data on the basis of the output signals from the detecting means; means for controlling ignition of the engine in accordance with the ignition timing data; first decision means for deciding the conditions required for interrupting the fuel injection on the basis of the output signals from the detecting means; means for commanding interruption of the fuel injection to the fuel injecting means in response to the decision of the first decision means to interrupt fuel injection; second decision means for deciding the conditions required for restoring the fuel injection on the basis of the output signals from the detecting means; means for commanding fuel injection to the fuel injecting means in response to the decision of the second decision means to restore the fuel injection; means for altering the determined ignition timing data in response to the decision of the second decision means to restore the fuel injection; and means for progressively correcting the altered ignition timing data to regain the determined ignition timing data before having been altered.

According to another aspect of the present invention, there is proposed a control method for an internal combustion engine for controlling electronically fuel injection and ignition timing of the engine in dependence on operating conditions of the engine, comprising steps of determining a first operating condition of the engine at deceleration thereof; interrupting the fuel injection in dependence on the determination of the first operating condition; determining a second operating condition of the engine in which the engine is operated at a lower speed than the speed in the first operating condition; restoring the fuel injection in dependence on the determination of the second operating condition; altering the ignition timing in dependence on the determination of the second operating condition; and restoring progressively the original ignition timing by correcting progressively the altered ignition timing.

BRIEF DESCRIPTION OF THE DRAWINGS

The above and other objects, novel features and advantages of the invention will become more apparent by the following description of the preferred embodiments of the invention taken in conjunction with the accompanying drawings, in which.

DETAILED DESCRIPTION

Figure 1:
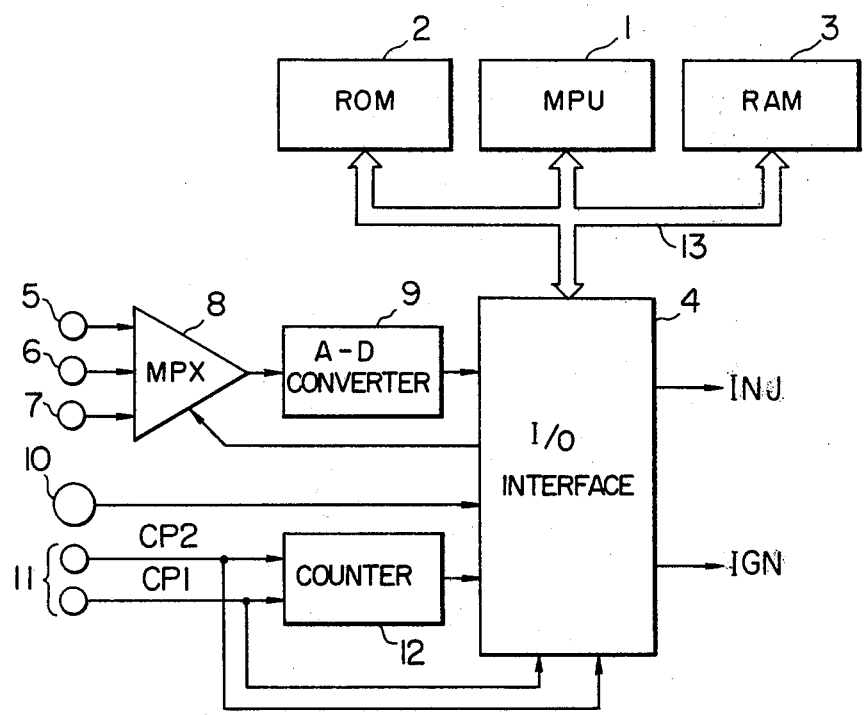
FIG. 1 is a block diagram to show the general arrangement of a control apparatus according to an embodiment of the invention.

Referring to FIG. 1 which shows a general layout of the control apparatus according to an embodiment of the invention, there is provided a control unit which is essentially composed of a micro-processor unit 1 (hereinafter referred to simply as MPU) which is adapted to perform digital processing operations, a memory device 2 (hereinafter referred to as ROM) which serves to store therein control programs and fixed data, a random access memory 3 (hereinafter referred to as RAM) which permits data read-out and/or write-in operations, and an input/output interface circuit 4 (hereinafter referred to I/O interface circuit). The MPU 1, ROM 2, RAM 3 and the I/O interface circuit 4 are interconnected to one another through an address bus, a data bus and control lines which are denoted by reference numeral 13 as a whole.

The control unit receives various input signals representative of operating conditions of an internal combustion engine and serves for various control functions such as ignition timing control, an ignition coil primary current flow initiating timing control, a fuel supply metering control, an exhaust gas control, an idling rotation number control of the engine operated in the idling mode and so forth.

There are further provided an air-flow meter 5 for detecting the quantity of air flowing into an intake manifold (not shown) of the engine, a temperature sensor 6 for detecting the temperature of the intake air flow, and a water temperature sensor 7 for detecting the temperature of engine cooling water. The output analog signals produced from these various sensors or detectors 5, 6 and 7 are input to a multiplexer 8 which functions to select the analog signal to be fed to an analog-to-digital converter or A-D converter 9 in dependence on the command supplied from the MPU 1 through the I/O interface circuit 4. The selected analog signal is converted into a corresponding digital signal by the A-D converter 9. The digital signal output from the A-D converter 9 is fed to the I/O interface circuit 4.

A switch 10 serves to detect the fully closed state of a throttle valve (not shown) to thereby produce a digital signal which is transmitted to the I/O interface circuit 4. A crank angle sensor 11 is adapted to be operated by a timing gear which is rotated in synchronism with a crankshaft of the engine, to thereby produce pulse signals CP1 and CP2 in dependence on the rotation angle of the crankshaft. The pulse CP1 is produced for every rotation angle of 180° of the crank shaft (assuming that the engine of concern is a four-cylinder type) and represents a reference crank angle position. On the other hand, the pulse CP2 is produced for every rotation angle of 1° of the crankshaft. These pulse signals CP1 and CP2 are directly supplied to the I/O interface circuit 4 and additionally fed to a revolution number (or speed) counter 12 which produces a digital signal representative of the revolution, speed of the engine crankshaft. The digital signal output from the counter 12 is also fed to the I/O interface circuit 4.

The signals output from the intake air temperature sensor 6 and the cooling water temperature sensor 7 may be utilized for correctively regulating a quantity of fuel to be injected, for example. However, the present invention is not concerned with such a correction of the fuel injection quantity. These sensors 6 and 7 are shown merely for illustrative purposes to show that various signals representing engine operating conditions are supplied to the control unit.

The output signals from the control unit with which the invention is concerned are a fuel injection signal INJ available from the I/O interface circuit 4 by supplying thereto fuel injection data, which is arithmetically determined from the input information by the MPU 1 in accordance with the control program stored in the ROM 2, and an ignition signal IGN available from the I/O interface circuit 4 by supplying thereto the ignition timing data. Usually, the fuel injection data is previously determined by the MPU 1 on the basis of the intake air flow detected by the air flow meter 5 and the revolution number of the engine obtained by counting the rotation angle pulse CP2 detected by the crank angle sensor 11. The fuel injection data thus determined is placed in a register of the I/O interface circuit 4 at a time point corresponding to the generation of the pulse signal CP1.

The ignition timing data is determined on the basis of engine crankshaft speed and engine load data which can be derived from the fuel injection quantity or the like.

Figure 2:
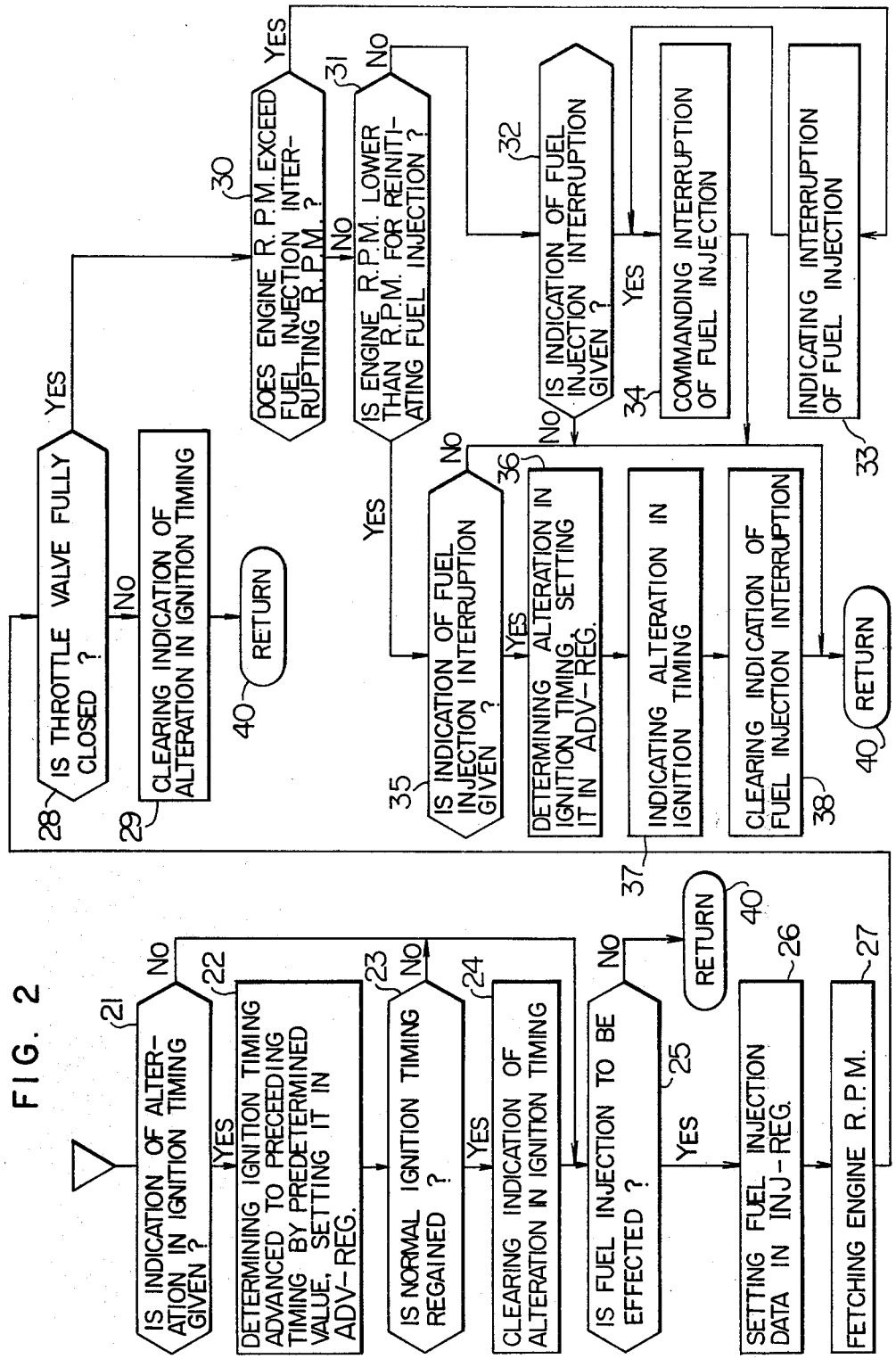
FIG. 2 is a flow chart for explaining the operation of the control apparatus and the control method according to the invention.

Now, the engine operation controlling process according to the invention will be described by referring to FIG. 2. As described hereinbefore, various arithmetic operations are executed by the MPU 1 for controlling operating conditions of the associated internal combustion engine. When a pulse CP1 is input to the MPU 1 through the I/O interface circuit 4, the operational routine shown in the flow-chart of FIG. 2 is initiated. In other words, the pulse signal CP1 is input directly to the control unit as an interrupt signal.

When the motor vehicle of concern is to be decelerated from the current driving speed, fuel injection to the engine is interrupted. Upon generation of the pulse CP1 immediately after the deceleration has been initiated, the MPU 1 will then first check if an indication of alteration in the ignition timing has been issued (step 21). Since alteration or modification in the ignition timing is made according to the invention only when the engine speed is to be accelerated from a value smaller than a predetermined speed, no indication of alteration in the ignition timing is made at that time. Consequently, the step 25 is executed where it is determined whether fuel injection is to be effected at that time point. When it is not the time to inject fuel, the present interrupt processing operation comes to an end (step 40), whereby other arithmetic operations are allowed to be executed. The step named "RETURN" designates the end of the interrupt processing operation. On the other hand, when a decision is made at the step 25 such that the fuel injection is to be effected, data corresponding to fuel injection is set in an INJ register of the I/O interface circuit 4 described hereinafter, while data of engine crankshaft speed is fetched by the I/O interface circuit 4 (steps 26 and 27). The fuel injection data is previously determined through arithmetic operations from the intake air flow and the revolution speed of the engine crankshaft and stored in memory. Subsequently, a determination is made as to whether the throttle valve is in the fully closed state or not (step 28). Since the throttle valve is usually in the fully closed position in the decelerating operation mode, it is then determined at the step 30 whether or not the current engine crankshaft speed exceeds a predetermined engine crankshaft speed at which the fuel injection is to be stopped or interrupted. Since the engine crankshaft speed is usually higher than a predetermined level immediately after the decelerating operation has been initiated, a flag indicating that the fuel injection is to be stopped is set at step 33, and the fuel injection interruption is commanded at step 34, and then the interrupt processing operation is terminated (step 40). As a result, although the fuel injection data has been set at the step 26, no fuel injection is effected. During the decelerating operation, it may happen that the throttle valve is opened, which means that the motor vehicle is to be instantly accelerated at a high rate. In this case, the interrupt processing operation is instantly completed through the steps 28 and 29 to effect no fuel injection interrupting control. It should be mentioned that at the step 29 any alteration or modification in the ignition timing is cleared if it has been made, as will be described hereinafter.

When the engine crankshaft speed has decreased below the predetermined engine crankshaft speed at which the fuel injection is to be stopped, this is determined at the step 30 in response to the appearance of the pulse CP1. Subsequently, at step 31, a determination is made as to whether or not the current engine crankshaft speed is lower than a predetermined speed at which the fuel injection is to be re-initiated. Since the engine will be stopped unless fuel injection is performed when the engine crankshaft speed is decreased below a predetermined speed, the speed at which fuel injection is to be re-initiated is preset and, if the engine crankshaft speed becomes lower than the present speed, fuel injection has to be restored. When it is determined at the step 31 that the engine crankshaft speed is higher than the preset speed for the re-initiation of fuel injection, then it is determined at the step 32 whether an indication to interrupt the fuel injection has been issued or not. Because such an indication for interrupting the fuel injection has been already given at the step 33, a command for the stopping or interruption of fuel injection is issued at the step 34 to complete the interrupt processing operation (step 40).

When the engine crankshaft speed has decreased to a speed at which fuel injection is to be re-initiated and which is lower than preset speed for interrupting or stopping fuel injection, the processing operations described above are executed up to the step 31, at which step a decision is made that the engine crankshaft speed is lower than the speed for re-initiating the fuel injection. Subsequently, it is determined at the step 35 whether an indication for the interruption of fuel injection has been issued or not. At this time, since an indication for stopping or interrupting the fuel injection has been already issued at the step 33, the execution of step 36 is effected at which an altered or modified value for the ignition timing data is arithmetically determined and set into an ADV-register of the I/O interface circuit 4 described hereinafter. Although the ignition time point is determined as an advanced angle from the top dead center of a piston, it is the data corresponding to a crank angle between the reference crank angle position and the ignition time point which is actually loaded into the ADV-register. In this connection, it should be recalled that the pulse signal CP1 represents the reference crank angle position. Thus, the dat set in the ADV-register corresponds to the crank angle from the generation of the pulse CP1 to the ignition time point. More particularly, when a decision is made such that the throttle valve is in the fully closed state, that the engine crankshaft speed is lower than the speed preset for the re-initiation or restoration of the interrupted fuel injection and that the fuel injection is being currently stopped, it is determined that the fuel injection is now to be restored from the interrupted state, and the data for the altered or modified ignition timing is set. Thus, the ignition timing is altered or modified. The alteration or modification of the ignition timing is such as delaying the normally advanced ignition time by a predetermined value. The normally advanced ignition timing or angle $\theta_{ADV}$ is determined from the engine load and the engine crankshaft speed, as described hereinbefore. The MPU 1 arithmetically determines the normal ignition timing in accordance with a function $\theta_{ADV}=f(N,L)$, where N and L represent the crankshaft speed and the load of engine, respectively. When the alteration or modification of the ignition timing data is to be made at the step 36, the MPU 1 arithmetically determines the ignition timing $\theta'_{ADV}$ delayed from the normally advanced ignition timing $\theta_{ADV}$ by a delay quantity $\Delta\theta$, as can be expressed by $\theta'_{ADV}=f(N,L)-\Delta\theta$. The delay value $\Delta\theta$ may be determined arbitrarily. The data placed in the ADV-register of the I/O interface circuit is thus equal to $180° - \theta'_{ADV}$ for the engine of four-cylinder type. Simultaneously with the setting of the altered or modified value of the ignition timing data, a flag indicating the alteration of the ignition timing is set, while the indication of the interruption of fuel injection is cleared (steps 37, 38).

Subsequently, upon the appearance of a pulse CP1, a determination is made at the step 21 as to whether an indication of the alteration in ignition timing is issued or not. Since an indication of alteration has occurred at the step 37, the step 22 is executed. At the step 22, the ignition timing advanced by a predetermined time or angle relative to the preceding ignition timing is arithmetically determined. The ignition timing data thus obtained is then set into the ADV-register of the I/O interface circuit 4. When the time point at which a pulse CP1 is produced is represented by t, while the time point at which the immediately preceding pulse CP1 is produced is represented by (t−1), with the ignition timings corresponding to the time points t and (t−1) being represented by $\theta_{ADV}(t)$ and $\theta_{ADV}(t-1)$, respectively, then the ignition timing determined at the step 22 can be expressed by $\theta_{ADV}(t)=\theta_{ADV}(t-1)+\Delta\theta_{ADV}$, where $\Delta\theta_{ADV}$ represents a predetermined value by which the ignition timing is to be advanced and which can be arbitrarily determined. The ignition is effected in accordance with the ignition timing as arithmetically determined at the step 22. Next, it is determined at the step 23 whether the ignition timing advanced by a predetermined value at the step 22 is reset to the normal ignition timing. In other words, it is determined at the step 23 if the quantity $\theta_{ADV}(t)$ determined at the step 22 conforms to $\theta_{ADV}=f(N,L)$. If otherwise, a determination is made at the step 25 as to whether it is the time for fuel injection or not. If the answer is negative, i.e. NO, the interrupt processing is terminated without setting the fuel injection data (step 40). On the other hand, if the answer is affirmative, i.e. YES, the fuel injection data is set (step 26). At this time, since the fuel injection stopping or interruption command is cleared at the step 38 the fuel injection is effected in accordance with the set fuel injection data. At the step 27, the data of the engine crankshaft speed is fetched. Subsequently, it is determined at the step 28 whether the throttle valve is fully closed or not. If the throttle valve is not in the fully closed state, the indication of alteration in the injection timing produced at the step 37 is cleared at the step 29, whereby the interrupt processing operation is brought to the end without altering the injection timing (step 40). On the other hand, in case the throttle valve is fully closed, the steps 30 and 31 are executed. At the step 31, it is determined whether or not engine crankshaft speed is lower than the predetermined speed at which the fuel injection is to be restored. If affirmative, at the step 35 it is determined whether an indication of the fuel injection stoppage has occurred. If negative, the same determination is made at the step 32. Since the indication of the fuel injection stoppage is cleared at the step 38, the interrupt processing operation is terminated (step 40). Consequently, the injection timing delayed for a predetermined value at the step 36 is progressively advanced at the step 22, and the ignition is effected in accordance with the progressively advanced ignition timing.

When it is determined at the step 23 that the progressively advanced ignition timing has regained normal ignition timing, that is, when it is determined that $\theta_{ADV}(t)$ becomes equal to $\theta_{ADV}$, the indication of alteration or modification in the ignition timing is cleared (step 24). Thereafter, the interrupt processing operation is terminated through the routines of steps 25-40, steps 25-26-27-28-29-40, steps 25-26-27-28-30-31-35-40, or steps 25-26-27-28-30-31-32-40. As can be seen from the flow chart shown in FIG. 2, neither alteration an of the ignition timing nor a fuel injection stoppage is made in these routines, whereby normal or usual engine operation control is allowed to be performed.

Figure 3:
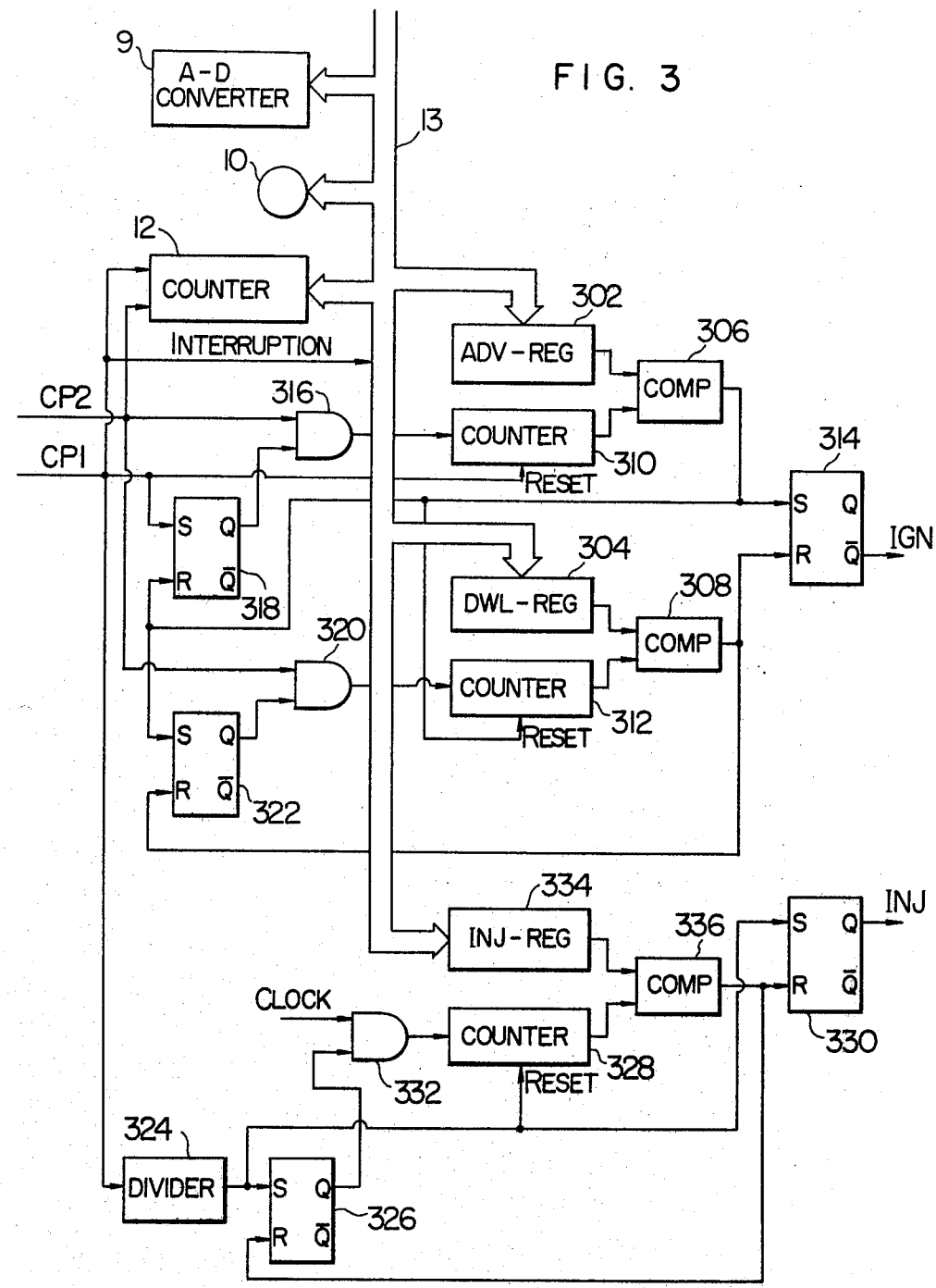
FIG. 3 is a block diagram to show in detail an input-/output interface circuit employed in the control apparatus shown in FIG. 1.

FIG. 3 is a block diagram showing a circuit portion of the I/O interface circuit which is relevant to the control according to the invention. The ignition timing data arithmetically determined by CPU 1 at the step 36 in the flow chart shown in FIG. 2 as well as the ignition timing data determined at the step 22 are set at the ADV-register which is denoted by reference numeral 302 in FIG. 3. In addition to the data for the ignition timing, data of the primary current flow initiating timing for the ignition coil (not shown) is also arithmetically determined and set in a DWL-register 304. The output from the ADV-register 302 is applied to an input of a comparator 306, while the output from the DWL-register 304 is applied to an input of a comparator 308. The comparator 306 has the other input connected to a first counter register 310 and produces an output pulse signal when the counts in the counter register 310 has attained the data value set at the ADV-register 302. On the other hand, the comparator 308 has the other input connected to a second counter register 312 and produces an output pulse signal when the counts in the counter register 312 has attained the data value set at the DWL-register 304. The output pulse signal from the comparator 306 constitutes an ignition timing pulse, while the output pulse signal from the comparator 308 constitutes a current flow initiation timing pulse. There is provided an RS flip-flop 314 which responds to the output signals from the comparators 306 and 308 to output logics "1" and "0" repeatedly. From the $\bar{Q}$ terminal of the RS flip-flop 314, the ignition signal IGN is produced to drive the ignition coil.

The first counter register 310 is adapted to count up the pulse CP2 supplied thereto through an AND gate 316 which is enabled by the Q-output signal from an RS flip-flop 318 which in turn is adapted to be set by the pulse signal CP1. The first counter register 310 is reset by the pulse signal CP1, while the RS flip-flop 318 is reset by the output signal from the comparator 306. Accordingly, when the RS flip-flop 318 is set by the pulse signal CP1 starting from the reset state as brought about by the output signal from the comparator 306, the AND gate 316 is opened or enabled, whereby the first counter 310 is allowed to count up pulse signals CP2 until the counts of the counter 310 coincide with the value set at the ADV-register 302, to thereby cause the comparator 306 to produce the output signal. Thus, by correcting the data value set at the ADV-register 302 so that the ignition timing is advanced for a predetermined value for every generation of the pulse CP1 at the step 22 shown in FIG. 2, the ignition timing, which has been forcibly delayed at the step 36, can be progressively advanced, which results in a smooth and progressive increasing in the torque or rotational moment of the engine when the fuel injection once interrupted is regained.

The second counter register 312 also counts pulse signals CP2 through an AND gate 320, the enabling condition of which is however different from that of the AND gate 316. That is, the AND gate 320 is enabled by the Q-output of an RS flip-flop 322 set by the output of the comparator 306 which resets the RS flip-flop 318, while the RS flip-flop 322 is reset by the output of the comparator 308. Accordingly, the second counter register 312 is capable of counting pulse signals CP2 in response to the output of the comparator 306 until the value set at the DWL-register 304 has been attained.

When the count value attained in the counter 312 coincides with the value set in the DWL-register 304, the signal IGN which has set at logic "0" level by the output from the comparator 306 is changed over to logic "1" level, whereby the primary current flow through the ignition coil is initiated.

The pulse signals CP1 generated once for every crank angle of 180° undergo frequency division through a frequency divider 324, whereby the frequency of the signal CP1 is stepped down to a half. In this manner, the output pulse from the frequency divider 324 will occur once for every crank angle at 360°. The output pulse of the frequency divider 324 is applied to the set terminal of the RS flip-flop 326 and the reset terminal of the counter 328 and also to the set terminal of the RS flip-flop 330. The Q output from the RS flip-flop 330 is utilized as the fuel injection signal INJ to drive a fuel injector to allow the fuel injection to be effected therethrough. When the output pulse signal from the frequency divider 324 is input to the RS flip-flop 326, the AND gate 332 is opened by the Q output thereof, whereby the counter 328 is allowed to receive a clock signal. At that time, the counter 328 is reset by the output pulse from the frequency divider 324. The clock signal is generated by an oscillator (not shown). An INJ-register 334 is set with the fuel injection data. This corresponds to the step 26 shown in FIG. 2. The output of the INJ-register 334 is fed to the comparator 336. The counter 328 counts the clock signals applied through the AND gate 332. The output from the counter 328 is fed to the comparator 336. When the counted value attained in the counter 328 coincides with the value set at the INJ-register 334, the comparator 336 produces an output signal which is applied to the reset terminal of the RS flip-flop 330, as a result of which the INJ signal is set to "0" level to stop fuel injection. The fuel injection interrupting command at the step 34 shown in FIG. 2 is issued by setting the INJ-register 334 to the zero state.

As will be appreciated from the foregoing description, when fuel injection is restored after the interruption thereof upon deceleration of the internal combustion engine, the ignition timing is delayed with reference to the normal ignition timing and then progressively restored to the normal ignition timing. Thus, rotational moment or torque of the engine can be increased smoothly upon re-initiation of the fuel injection even when the speed range in which the fuel injection is interrupted is set wide, i.e. to a very low engine crankshaft speed, whereby an adverse influence on a confortable ride can effectively be prevented.

What I claim is:

1. A method of operating a processor-controlled internal combustion engine, wherein control signals for controlling the supply of fuel and ignition timing for the engine are generated in response to data produced in accordance with signals indicative of operating conditions of the engine, comprising the steps of:

(a) in response to the throttle valve of the engine being in the fully closed position and in response to the engine crankshaft speed exceeding a preselected speed generating a first control signal in response to which the supply of fuel to the engine is interrupted;

(b) in response to the occurrence of a prescribed condition of engine operation for which the supply of fuel to the engine is to be resumed, generating a second control signal in response to which the ignition timing is modified by a prescribed amount and setting a flag representative of said modification of the ignition timing; and (c) in response to said flag representative of said modification of the ignition timing being set, causing the amount by which said ignition timing has been modified by said second control signal to be sequentially adjusted until the ignition timing corresponds to the ignition timing in accordance with which said engine is normally operated and thereupon resetting said flag and resuming normal ignition.

2. A method of operating a processor-controlled internal combustion engine according to claim 1, wherein, in step (b) said ignition timing is retarded by a prescribed amount.

3. A method of operating a processor-controlled internal combustion engine according to claim 1, wherein step (c) includes the step of causing the amount by which said ignition timing has been modified by said second control signal to be sequentially advanced until the ignition timing corresponds to said normal ignition timing.

4. A method of operating a processor-controlled internal combustion engine according to claim 1, wherein step (b) further comprises the step of terminating the generation of said first control signal.

5. A method of operating a processor-controlled internal combustion engine according to claim 1, wherein step (c) comprises causing said ignition timing to be sequentially adjusted in synchronism with the rotation of the engine crankshaft.

6. A method of operating a processor-controlled internal combustion engine according to claim 5, wherein step (c) comprises the step of supplying an interrupt to said processor in synchronization with rotation of the engine crankshaft and adjusting said ignition timing in response to said interrupt.

7. A method of operating a processor-controlled internal combustion engine according to claim 1, wherein said prescribed engine condition corresponds to said engine crankshaft speed being less than a predetermined speed.

* * * * *